(12) United States Patent
Miyamoto et al.

(10) Patent No.: US 12,493,291 B2
(45) Date of Patent: Dec. 9, 2025

(54) AUTOMATIC RUN METHOD, AUTOMATIC RUN SYSTEM, AND AUTOMATIC RUN PROGRAM

(71) Applicant: Yanmar Holdings Co., Ltd., Osaka (JP)

(72) Inventors: Shinnosuke Miyamoto, Okayama (JP); Keisuke Iwamura, Okayama (JP); Dai Uehara, Okayama (JP); Shogo Suzuki, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 358 days.

(21) Appl. No.: 18/121,536

(22) Filed: Mar. 14, 2023

(65) Prior Publication Data

US 2023/0315088 A1 Oct. 5, 2023

(30) Foreign Application Priority Data

Mar. 31, 2022 (JP) .................. 2022-059519

(51) Int. Cl.
*G05D 1/00* (2006.01)
(52) U.S. Cl.
CPC ......... *G05D 1/0044* (2013.01); *G05D 1/0016* (2013.01); *G05D 1/0088* (2013.01)

(58) Field of Classification Search
CPC .. G05D 1/0044; G05D 1/0016; G05D 1/0088; G05D 1/0055; A01B 69/008
USPC ............................................. 701/50
See application file for complete search history.

(56) References Cited

U.S. PATENT DOCUMENTS

| | | | | |
|---|---|---|---|---|
| 11,399,454 B2* | 8/2022 | Miyashita | ........... | G05D 1/0212 |
| 2015/0346724 A1 | 12/2015 | Jones et al. | | |
| 2017/0235305 A1 | 8/2017 | Jung et al. | | |
| 2020/0359547 A1* | 11/2020 | Sakaguchi | ......... | B60W 60/005 |
| 2022/0287218 A1* | 9/2022 | Yuasa | .................... | B60K 31/00 |

FOREIGN PATENT DOCUMENTS

| | | | |
|---|---|---|---|
| JP | 2002312034 A | | 10/2002 |
| JP | 2004220422 A | | 8/2004 |
| JP | 2018041359 A | | 3/2018 |
| JP | 2020006872 A | | 1/2020 |
| WO | WO-2020174839 | * | 9/2020 |

* cited by examiner

*Primary Examiner* — Muhammad Shafi
(74) *Attorney, Agent, or Firm* — Chris Mizumoto

(57) ABSTRACT

A run processing unit causes a work vehicle to automatically run following a target route. A reception processing unit receives, from an operator, a correcting operation that corrects a positional deviation between the work vehicle and the target route, and a offset processing unit prohibits, when the positional deviation is a threshold value or over, the work vehicle correcting action that is in response to the correcting operation.

11 Claims, 14 Drawing Sheets

THIS INSTRUMENT BEING OPERATED AUTOMATICALLY

THIS INSTRUMENT BEING OPERATED AUTOMATICALLY

AUTOMATIC RUN METHOD, AUTOMATIC RUN SYSTEM, AND AUTOMATIC RUN PROGRAM

CROSS-REFERENCE

This application claims foreign priority of JP2022-059519, filed Mar. 31, 2022, the disclosure of which is hereby incorporated by reference in its entirety.

TECHNICAL FIELD

The present invention relates to an automatic run method, an automatic run system, and an automatic run program that are capable of causing a work vehicle to automatically run.

BACKGROUND ART

There is known a technology that corrects a position of a work vehicle when the work vehicle is automatically running following a target route in a farm field and when the work vehicle deviates from the target route. For example, Patent Document 1 describes a technology in which an operator, by operating a switch provided in the work vehicle, corrects the position of the work vehicle by a distance (correction amount) that corresponds to the operation.

PRIOR ART DOCUMENT

Patent Document

Patent Document 1: Japanese Unexamined Patent Application Publication No. 2020-006872

SUMMARY OF INVENTION

Technical Problem

However, in the conventional technology, the operator can optionally set the correction amount; thus, when the correction amount is larger than necessary, for example, the behavior of the work vehicle performing the correcting action becomes unstable, resulting in a problem of a deteriorated work accuracy.

An object of the present invention is to provide an automatic run method, an automatic run system, and an automatic run program that are capable of suppressing a deteriorated work efficiency seen when correcting a positional deviation of a work vehicle.

Solution to Problem

An automatic run method according to the present invention includes: causing a work vehicle to automatically run following a target route; receiving, from an operator, a correcting operation that corrects a positional deviation between the work vehicle and the target route; and prohibiting, when the positional deviation is a threshold value or over, the work vehicle's correcting action that is in response to the correcting operation.

An automatic run system according to the present invention includes: a run processing unit; a reception processing unit; and a correction processing unit. The run processing unit causes a work vehicle to automatically run following a target route. The reception processing unit receives, from an operator, a correcting operation that corrects a positional deviation between the work vehicle and the target route. The correction processing unit prohibits, when the positional deviation is a threshold value or over, the work vehicle's correcting action that is in response to the correcting operation.

An automatic run program for causing one or more processors to execute operations comprising: causing a work vehicle to automatically run following a target route; receiving, from an operator, a correcting operation that corrects a positional deviation between the work vehicle and the target route; and prohibiting, when the positional deviation is a threshold value or over, the work vehicle's correcting action that is in response to the correcting operation.

Advantageous Effects of Invention

The present invention can provide an automatic run method, an automatic run system, and an automatic run program that are capable of suppressing a deteriorated work efficiency seen when correcting a positional deviation of a work vehicle.

DESCRIPTION OF EMBODIMENTS

The following embodiments are each an example of embodying the present invention, and are not intended to limit the technical scope of the present invention.

Figure 1:
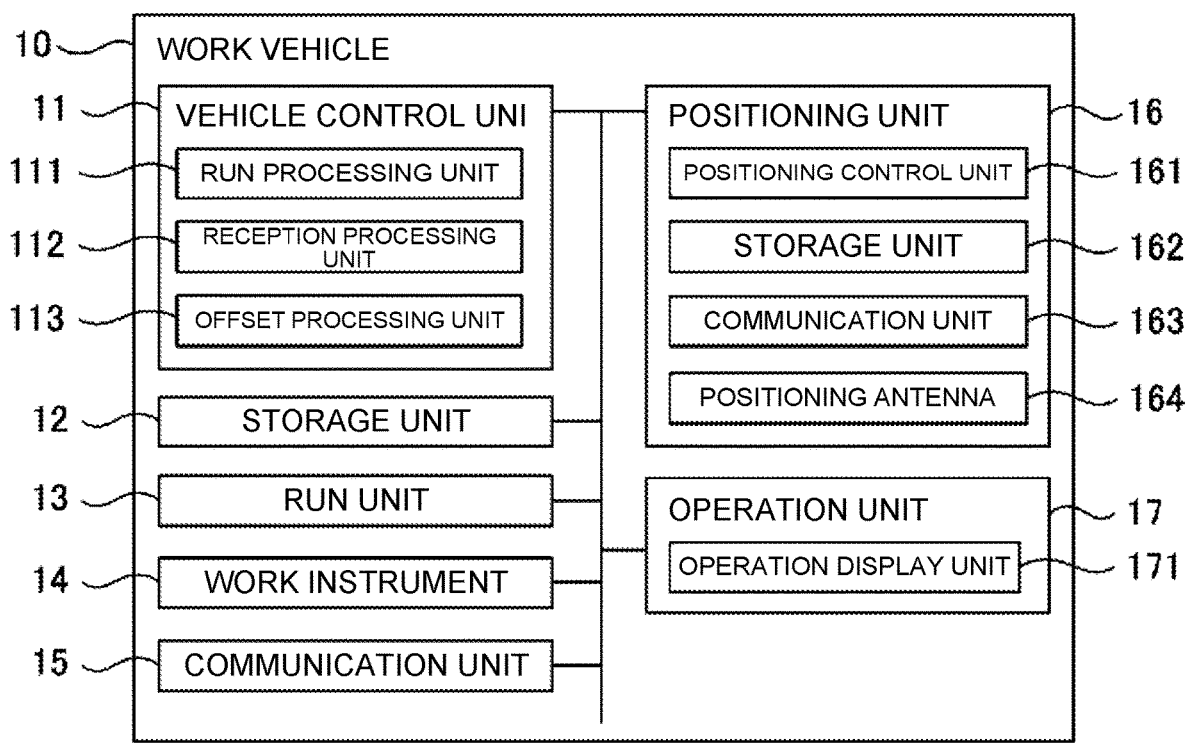
FIG. 1 is a block diagram showing a configuration of a work vehicle according to an embodiment of the present invention.
Figure 2:
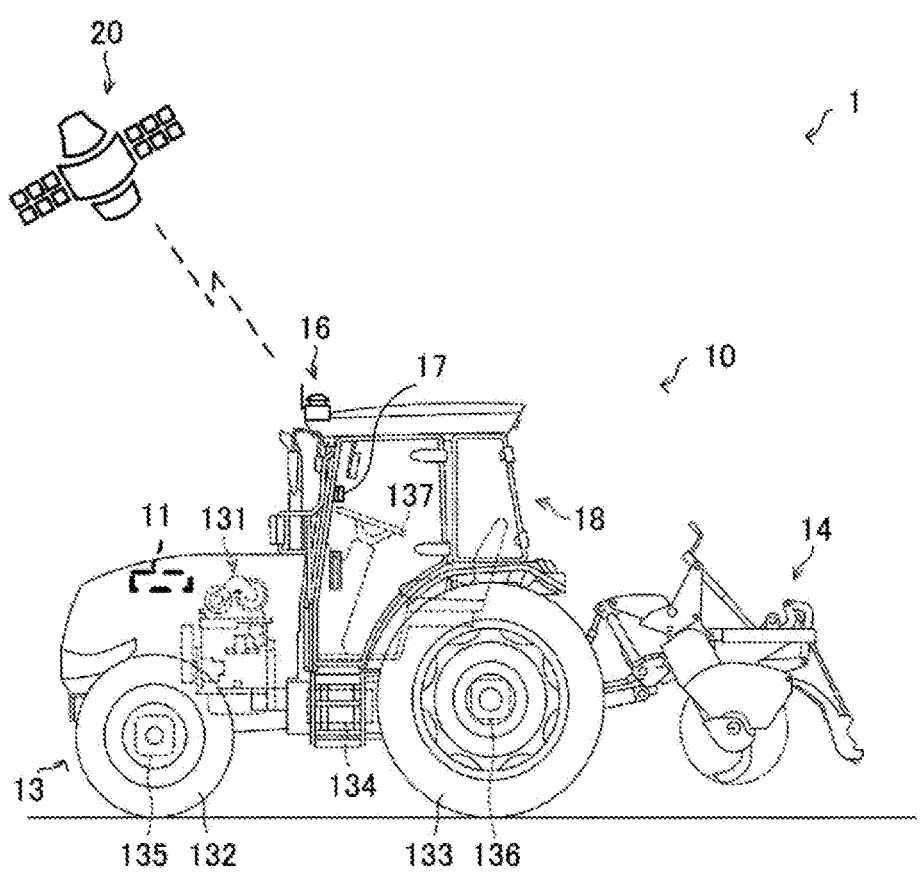
FIG. 2 is an external view showing an example of the work vehicle according of the embodiment of the present invention.

As shown in FIGS. 1 and 2, an automatic run system 1 according to an embodiment of the present invention includes a work vehicle 10, a satellite 20, a base station (not shown). In the present embodiment, a description will be made on a case where the work vehicle 10 is a tractor as an example. As another embodiment, the work vehicle 10 may be a rice transplanter, a combine harvester, a construction machine, a snowplow, or the like. In response to the operator's operation, the work vehicle 10 performs given work (for example, tillage work) while running following a target route R in a farm field F (see FIG. 4). Specifically, the work vehicle 10 runs straight ahead on the target route R in response to an automatic steering, and perform a turn run in response to a manual steering (driving operation) by the operator. The work vehicle 10 runs in the farm field F while switching between the automatic run on a straight ahead route and the manual run on a turn route, thereby to perform the work. The target route R may be preliminarily generated based on the operator's operation, and stored as route data.

Figure 4:
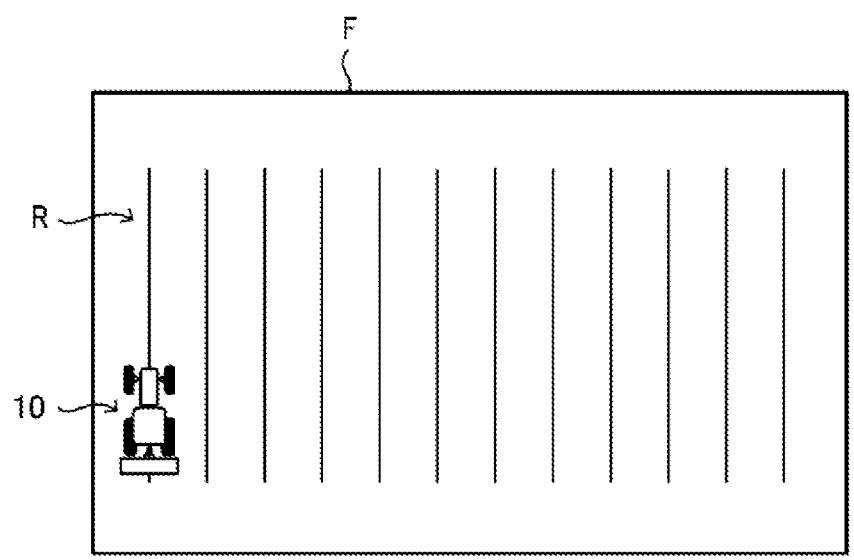
FIG. 4 is a view showing an example of a target route of the work vehicle according to the embodiment of the present invention.

For example, in the farm field F shown in FIG. 4, the work vehicle 10 runs by repeating the straight ahead run and the turn run until the work is ended. The multiple straight ahead routes are substantially parallel to each other. The target route R shown in FIG. 4 is one example, and the target route R is appropriately determined according to a size of the work vehicle 10, a size of a work instrument 14, contents of the work, a shape of the farm field F, and the like.

The automatic run system 1 includes an operation terminal (a tablet terminal, a smartphone, or the like) that is operated by the operator. The operation terminal can communicate with the work vehicle 10 via a communication network such as a mobile phone network, a packet line network, or a wireless LAN. For example, the operator operates the operation terminal to register various types of information (work vehicle information, farm field information, work information, and the like), and the like. At a position away from the work vehicle 10, the operator can grasp a running status, a work status, and the like of the work vehicle 10 from a running track that is displayed on the operation terminal.

[Work Vehicle 10]

As shown in FIG. 1 and FIG. 2, the work vehicle 10 includes a vehicle control unit 11, a storage unit 12, a run unit 13, the work instrument 14, a communication unit 15, a positioning unit 16, an operation unit 17, and the like. The vehicle control unit 11 is electrically connected to the storage unit 12, the run unit 13, the work instrument 14, the positioning unit 16, the operation unit 17, and the like. Note that the vehicle control unit 11 and the positioning unit 16 may be capable of performing a wireless communication.

The communication unit 15 is a communication interface that connects the work vehicle 10 to the communication network in a wired or wireless manner, and performs, via the communication network, data communication, which accords to a given communication protocol, with an external device (operation terminal or the like).

The storage unit 12 is a non-volatile storage unit such as a HDD (Hard Disk Drive) or a SSD (Solid State Drive) that stores various types of information. The storage unit 12 stores a control program such as an automatic run program for causing the vehicle control unit 11 to perform an automatic run process to be described below (see FIG. 13). For example, the automatic run program is non-transiently recorded in a computer-readable recording medium such as a CD or a DVD, is read by a given reading unit (not shown), and is stored in the storage unit 12. Further, the automatic run program may be downloaded from a server (not shown) via the communication network to the work vehicle 10 and be stored in the storage unit 12. Further, the storage unit 12 may store data on the target route R that is generated in the operation unit 17.

The run unit 13 is a driving unit that causes the work vehicle 10 to run. As shown in FIG. 2, the run unit 13 has an engine 131, a front wheel 132, a rear wheel 133, a transmission 134, a front axle 135, a rear axle 136, and a steering wheel 137, and the like. It is noted that the front wheel 132 and the rear wheel 133 are provided on the left and right sides, respectively, of the work vehicle 10. Further, the run unit 13 is not limited to that of a wheel type including the front wheels 132 and the rear wheels 133 but may be that of a crawler type including crawlers provided to the right and left sides of the work vehicle 10.

The engine 131 is a drive source such as a diesel engine or a gasoline engine driven by using a fuel supplied to a fuel tank (not shown). The run unit 13 may include an electric motor as a drive source together with the engine 131 or instead of the engine 131. It is noted that a generator (not shown) is connected to the engine 131, and supplies electric power to electric components such as the vehicle control unit 11, a battery and the like, which are provided in the work vehicle 10. The battery stores the electric power supplied from the generator. Further, even after the engine 131 is stopped, the electric components such as the vehicle control unit 11, the positioning unit 16, and the operation unit 17, which are provided in the work vehicle 10, can be driven by the electric power supplied from the battery.

A drive force of the engine 131 is transmitted via the transmission 134 and the front axle 135 to the front wheel 132, and is transmitted via the transmission 134 and the rear axle 136 to the rear wheel 133. Also, the drive power of the engine 131 is transmitted via a PTO shaft (not shown) to the work instrument 14. The run unit 13 performs a running motion according to a command of the vehicle control unit 11.

The work instrument 14 is, for example, a cultivator, a seeder, a mower, a plow, a fertilizer applicator or the like, which can be removably attached to the work vehicle 10. As a result, the work vehicle 10 can perform any of the various work by using each of the work instruments 14. FIG. 2 shows a case where the work instrument 14 is the cultivator. In the work vehicle 10, the work instrument 14 may be supported by a lifting/lowering mechanism (not shown) in a manner to be lifted or lowered. The vehicle control unit 11 can lift/lower the work instrument 14 by controlling the lifting/lowering mechanism.

The steering wheel 137 is an operation unit operated by the operator or by the vehicle control unit 11. For example, the run unit 13 changes an angle of the front wheel 132 by a hydraulic power steering mechanism (not shown) in response to the steering wheel 137's operation by the operator or the vehicle control unit 11, thereby to change a forward direction of the work vehicle 10.

Further, other than the steering wheel 137, the run unit 13 includes a shift lever (not shown), an accelerator (not shown), and a brake (not shown) which are operated by the vehicle control unit 11. Then, in the run unit 13, a gear of the transmission 134 is switched to a forward gear, a backward gear or the like in response to the vehicle control unit 11's operation of the shift lever, and a run mode of the work vehicle 10 is switched to be forward, backward or the like. Further, operating the accelerator, the vehicle control unit 11 controls a revolution speed of the engine 131. Further, the vehicle control unit 11 operates the brake, and controls rotations of the front wheels 132 and the rear wheels 133 by using an electromagnetic brake.

The positioning unit 16 is a communicator including a positioning control unit 161, a storage unit 162, a communication unit 163, a positioning antenna 164 and the like. For example, as shown in FIG. 2, the positioning unit 16 is provided at an upper portion of the cabin 18 where the operator boards. However, a place for placing the positioning unit 16 is not limited to the cabin 18. Further, the positioning control unit 161, the storage unit 162, the communication unit 163, and the positioning antenna 164 of the positioning unit 16 may be dispersed at different positions in the work vehicle 10. As described above, the battery is connected to the positioning unit 16, and thus the positioning unit 16 can be operated even when the engine 131 is stopped. For example, a mobile phone terminal, a smartphone, a tablet terminal, or the like may be used as the positioning unit 16.

The positioning control unit 161 is a computer system having one or more processors, and a storage memory such as a non-volatile memory and a RAM. The storage unit 162 is non-volatile memory or the like that stores: a positioning control program for causing the positioning control unit 161 to perform a positioning process; and data such as positioning information and movement information. For example, the positioning control program is non-transiently recorded in a computer-readable recording medium such as a CD or a DVD, and is read by a given reader (not shown) and stored in the storage unit 162. Further, the positioning control program may be downloaded from a server (not shown) via the communication network to the positioning unit 16 and stored in the storage unit 162.

The communication unit 163 is a communication interface that connects the positioning unit 16 to the communication network in the wired or wireless manner, and performs, via the communication network, the data communication, which accords to the given communication protocol, with the external device such as a base station server.

The positioning antenna 164 receives a radio wave (GNSS signal) emitted from the satellite 20.

The positioning control unit 161 calculates a current position of the work vehicle 10 based on the GNSS signal received by the positioning antenna 164 from the satellite 20. For example, when the positioning antenna 164 receives, while the work vehicle 10 automatically runs in the farm field F, the radio waves (emitted time, locus information, and the like) emitted from each of the multiple satellites 20, the positioning control unit 161 calculates a distance between the positioning antenna 164 and each of the satellites 20 and, based on the calculated distance, calculates the current position (a latitude and a longitude) of the work vehicle 10. Also, the positioning control unit 161 may perform a real-time kinematic positioning method (RTK-GPS positioning method (RTK method)) that calculates the current position of the work vehicle 10 by using correction information that corresponds to the base station (a reference station) near the work vehicle 10. As described above, the work vehicle 10 performs the automatic run by using the positioning information by the RTK-method. Further, the current position of the work vehicle 10 may be the same position as the positioned position (for example, a position of the positioning antenna 164) or may be a position that deviates from the positioned position.

Figure 3:
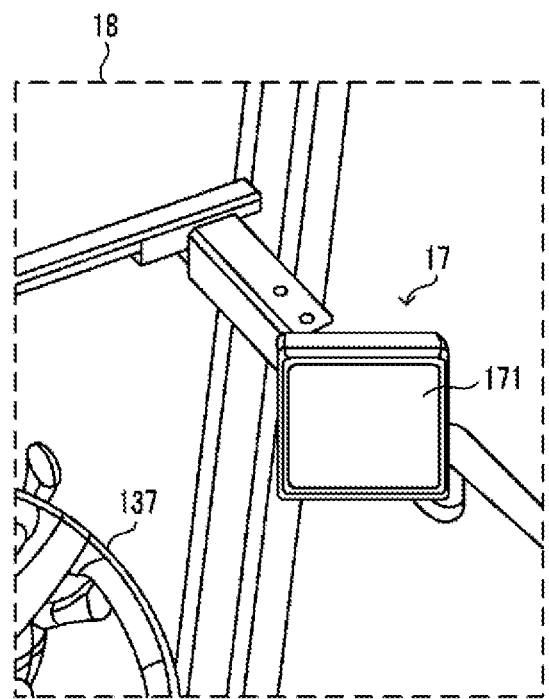
FIG. 3 is an external view showing an example of an operation unit according to the embodiment of the present invention.

The operation unit 17 is a device operated by the operator boarding the work vehicle 10, and is provided with an operation display unit 171. The operation display unit 171 is a user interface that includes: a display unit, such as a liquid crystal display or an organic EL display, for displaying various types of information; and an operation unit, such as an operation button or a touch screen, that receives an operation. The operation display unit 171 displays various setting screens and work screens. Further, the operation display unit 171 receives the operator's operation on the setting screen or the work screen. For example, as shown in FIG. 2 and FIG. 3, the operation unit 17 is placed near the steering wheel 137 in the cabin 18. Also, the operation unit 17 may be an operation terminal (tablet terminal, smartphone and the like) that can be carried by the operator.

The operation unit includes an automatic run button (not shown) for the operator to give a run start instruction to the work vehicle 10, and an offset button (not shown) for an offset operation (an example of a correcting operation of the present invention) that corrects a positional deviation L between the work vehicle 10 and the target route R. The automatic button and the offset button include, for example, electronic button images that are displayed on the display unit. Further, on the operation unit 17, the operator can make various settings related to the automatic run. The operation unit 17 is an example of an operation terminal of the present invention.

The vehicle control unit 11 has a control device such as a CPU, a ROM, and a RAM. The CPU is a processor that performs various types of arithmetic processes. The ROM is a non-volatile storage unit in which control programs, such as a BIOS and an OS, for causing the CPU to perform the various types of arithmetic processes are preliminarily stored. The RAM is a volatile or non-volatile storage unit that stores various types of information, and is used as a transient storage memory (work area) of the various types of processes to be performed by the CPU. Then, performing, with the CPU, the various types of control programs preliminarily stored in the ROM or the storage unit 12, the vehicle control unit 11 controls the work vehicle 10.

As shown in FIG. 1, the vehicle control unit 11 includes various processing units such as a run processing unit 111, a reception processing unit 112, an offset processing unit 113, and the like. It is noted that the vehicle control unit 11 performs, by the CPU, various types of processes that accord to the automatic run program, thereby to function as the various types of processing units. Further, part or all of the processing units may be configured by an electronic circuit. It is noted that the automatic run program may be a program for causing a multiplicity of processors to function as the processing units.

The run processing unit 111 controls the run of the work vehicle 10. Specifically, when the run mode of the work vehicle 10 is the manual run (manual run mode), the run processing unit 111 causes the work vehicle to manually run based on the operator's operation (manual steering). For example, the run processing unit 111 acquires operation information that corresponds to driving operations by the operator, such as a steering wheel operation, a speed change operation, a shift operation, an accelerating operation, and a brake operation, thereby to cause the run unit 13 to perform the running motion based on the operation information.

Further, the run processing unit 111, when the run mode of the work vehicle 10 is the automatic run (automatic run mode), causes the work vehicle 10 to automatically run based on position information (positioning information) showing the work vehicle 10's current position positioned by the positioning control unit 161. For example, the run processing unit 111, when the work vehicle 10 meets an automatic run start condition and acquires a run start instruction from the operator, causes the work vehicle 10 to start the automatic run based on the positioning information. Then, the run processing unit 111 causes the work vehicle 10 to automatically run according to the target route R (straight ahead route) preliminarily generated.

Figure 5A:
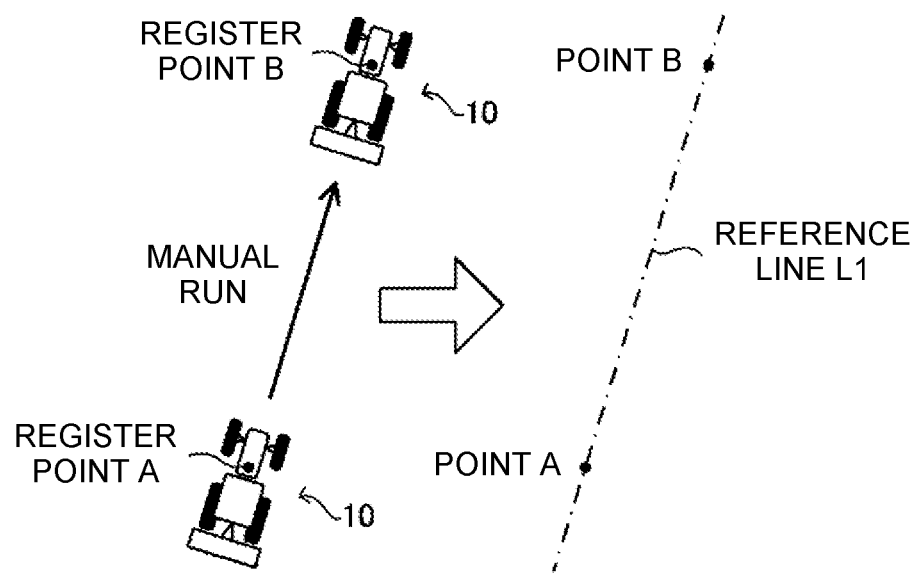
FIG. 5A is a diagram showing a run method of an automatic run in the work vehicle according to the embodiment of the present invention.
Figure 5B:
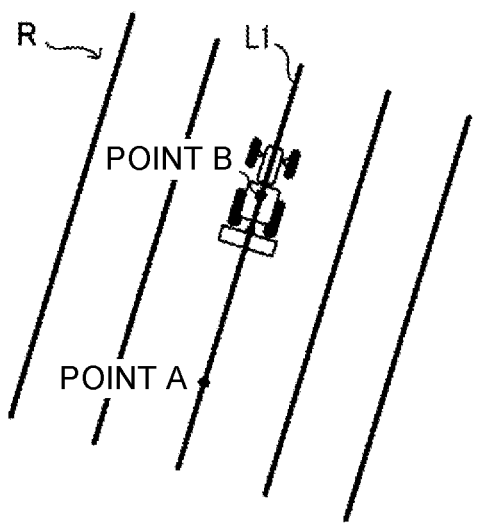
FIG. 5B is a diagram showing the run method of the automatic run in the work vehicle according to the embodiment of the present invention.

Here, a specific example (first run pattern) of the automatic run according to the present embodiment will be described with reference to FIG. 5 and FIG. 6. In the present embodiment, the work vehicle 10 is caused to automatically run in the farm field F shown in FIG. 4.

First, the operator sets a reference line L1 for generating the straight ahead route which is the target route R. For example, at an optional position in the farm field F (an outer peripheral end portion, for example), the operator causes the work vehicle 10 to manually run in a direction (target direction) in which the operator wants the work vehicle to run and to work. Specifically, the operator causes the work vehicle to run straight ahead in a direction parallel to a work direction (a cultivating direction, for example) used when the work vehicle 10 is to work in the work area. Then, the operator, when the work vehicle 10 is being caused to manually run in the intended target direction, operates (for example, touches) the operation display unit 171 twice at any position (for example, front or rear end portion of the work area). The vehicle control unit 11, by the operator's first operation, registers a position (point A) of the work vehicle 10, and registers, by the operator's second operation, a position (point B) of the work vehicle 10. Acquiring the position information of the point A and point B, the vehicle control unit 11 sets, as the reference line L1, a straight line passing through the point A and the point B (see FIG. 5A). The vehicle control unit 11 may be able to register the point B when the work vehicle 10 has run a given distance (for example, 5 m) after registering the point A. This can set the reference line L1 that is more accurate. The vehicle control unit 11 generates a run route (target route R) that includes the reference line L1 and a multiplicity of straight lines parallel to the reference line L1. For example, the vehicle control unit 11 generates a multiplicity of parallel straight lines based on a preset work width (lateral width of the work instrument 14) and a lap width (width overlapping the adjacent worked area), equally spaced left and right with the reference line L1 as a center (see FIG. 5B). The vehicle control unit 11 registers the generated target route R in the storage unit 12, and causes the operation unit 17 to display the generated target route R.

Figure 5C:
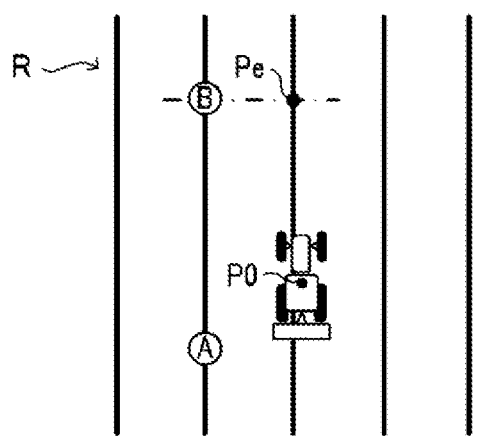
FIG. 5C is a diagram showing the run method of the automatic run in the work vehicle according to the embodiment of the present invention.

After the target route R is generated; for causing the work vehicle 10 to run straight ahead by the automatic steering in the farm field F, the operator, while watching the target route R displayed on the operation unit 17, moves the work vehicle 10 by the manual steering so that the direction (azimuth) of the work vehicle 10 becomes within a given range (given azimuth) relative to the direction of the reference line L1 (satisfying the automatic run start condition) (see FIG. 5C).

Figure 6A:
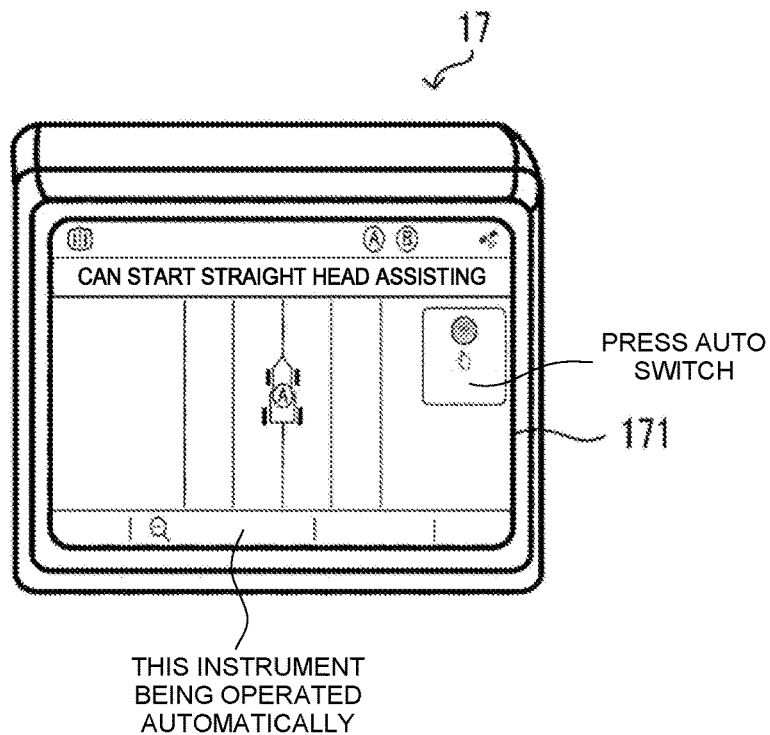
FIG. 6A is a diagram showing an example of a work screen displayed on the operation unit according to the embodiment of the present invention.

FIG. 6A shows an operation screen showing that the work vehicle 10 has met the automatic run start condition and is ready for the automatic run. The vehicle control unit 11, when the work vehicle 10 meets the automatic run start condition, causes the operation display unit 171 to display the operation screen shown in FIG. 6A. When the work vehicle 10 is ready for the automatic run, the operator presses the automatic run button (not shown) of the operation display unit 171 thereby to give the run start instruction. When the reception processing unit 112 receives the run start instruction, the run processing unit 111 starts an automatic steering of the work vehicle 10 so that the work vehicle 10 is along the straightest route closest to a current position PO (see FIG. 5C). With this, the run processing unit 111 causes the work vehicle 10 to automatically run by the automatic steering along the straight ahead route.

Figure 6B:
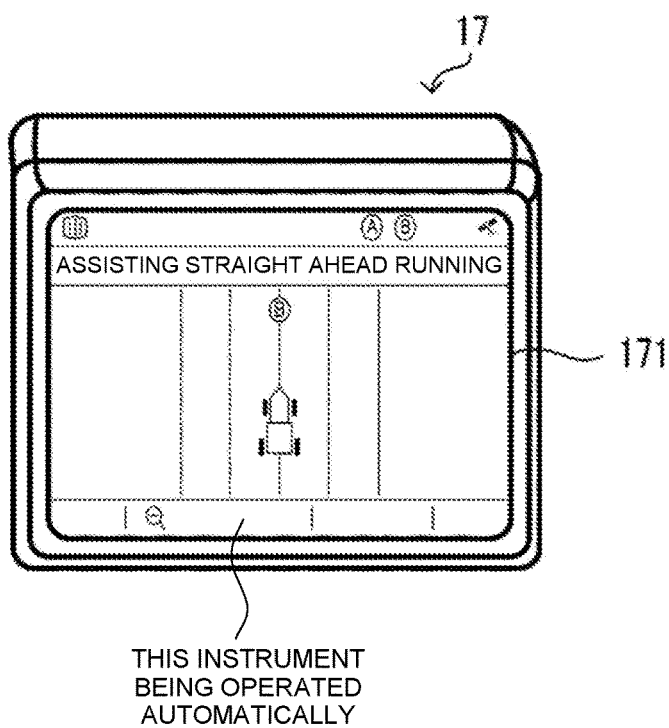
FIG. 6B is a diagram showing an example of the work screen displayed on the operation unit according to the embodiment of the present invention.

FIG. 6B shows the display screen seen when the work vehicle 10 is automatically running. The vehicle control unit 11, when the work vehicle 10 starts the automatic run, causes the operation display unit 171 to display the display screen shown in FIG. 6B. The vehicle control unit 11, on the display screen, displays the straight ahead route, a work-ended area (work status), and the like.

As described above, the first run pattern of the automatic run is so configured that the automatic run is performed by preliminarily generating the target route R according to the work width and lap width of the work vehicle 10. As a second run pattern of the automatic run, it may be so configured that the automatic run is performed by generating the target route R based on the position of the work vehicle 10.

In the second run pattern, after the reference line L1 is set (see FIG. 5A), for example; when the operator moves the work vehicle 10 to the work start position and presses the automatic run button, the vehicle control unit 11 causes the work vehicle 10 to run straight ahead, from the work start position, parallel to the reference line L1 by the automatic steering.

The vehicle control unit 11 may apply the first and second run patterns according to the operator's selecting operation. For example, the vehicle control unit 11 may selectably display, on the setting screen (not shown), a first route creation mode that corresponds to the first run pattern and a second route creation mode that corresponds to the second run pattern, thereby to perform the automatic run by the route creation mode selected by the operator.

In the first and second run patterns; when the work vehicle 10 runs straight ahead by the automatic steering thereby to approach an end point Pe (point where a line perpendicular to the reference line L1 and passing through the point B intersects with the straight ahead route (straight line)) that corresponds to the point B of the reference line L1 (see FIG. 5C), the run processing unit 111 gives, to the operator, guidance information showing that the work vehicle 10 has approached the end point Pe (a message display, a voice guidance, etc.). Confirming the guidance information, the operator ends the automatic steering.

The run processing unit 111, when the work vehicle 10 reaches the end point Pe (end point of straight ahead route), switches the run mode to the manual run. The run processing unit 111 may switch the run mode to the manual run when determining that the work vehicle 10 has reached the end point Pe, or may switch the run mode to the manual run in response to the operator's operation. When the run mode is switched to the manual run, the operator causes the work vehicle 10 to perform the turn run by the manual steering, for example.

As described above, the run processing unit 111 switches the run mode in response to the operator's operation on the operation unit 17, causes the work vehicle 10 to automatically run on the straight ahead route (the target route R) by the automatic steering, and to manually run on the turn route by the manual steering. The run processing unit 111 is an example of a run processing unit of the present invention.

The reception processing unit 112 receives the various operations by the operator. For example, the reception processing unit 112, on the setting screen (not shown) for setting the work information displayed on the operation unit 17, receives operations to set the type, work width, lap width, route offset amount, etc. of the work instrument 14. Further, from the operator, the reception processing unit 112, on the work screen D1 (see FIG. 8A), receives an operation to offset the target route R (offset operation). The offset operation is an example of the correcting operation. For example, when the positional deviation (position shift) between the work vehicle 10 and the target route R is caused, the operator performs the offset operation for correcting the positional deviation so that the work vehicle 10 runs on the target route R.

Figure 7:
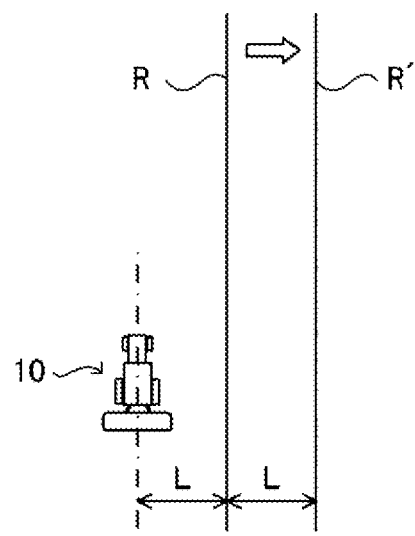
FIG. 7 is a diagram showing an example of an offset operation according to the embodiment of the present invention.

For example, as shown in FIG. 7, when the work vehicle 10 deviates from the target route R to the left by the positional deviation L, the operator presses down the offset button (first offset button) a given number of times thereby to move (offset) the target route R to the right. For example, the operator successively presses down the first offset button several times so that the target route R is offset to the right by a distance L. An R' shown in FIG. 7 shows the target route after offset. Further, the offset amount (change amount) by which the target route R is offset when the offset button is once pressed down may be preset. Further, on the setting screen (not shown), the change amount may be settable by the operator within a given range (e.g., 1 cm to 10 cm).

Figure 8A:
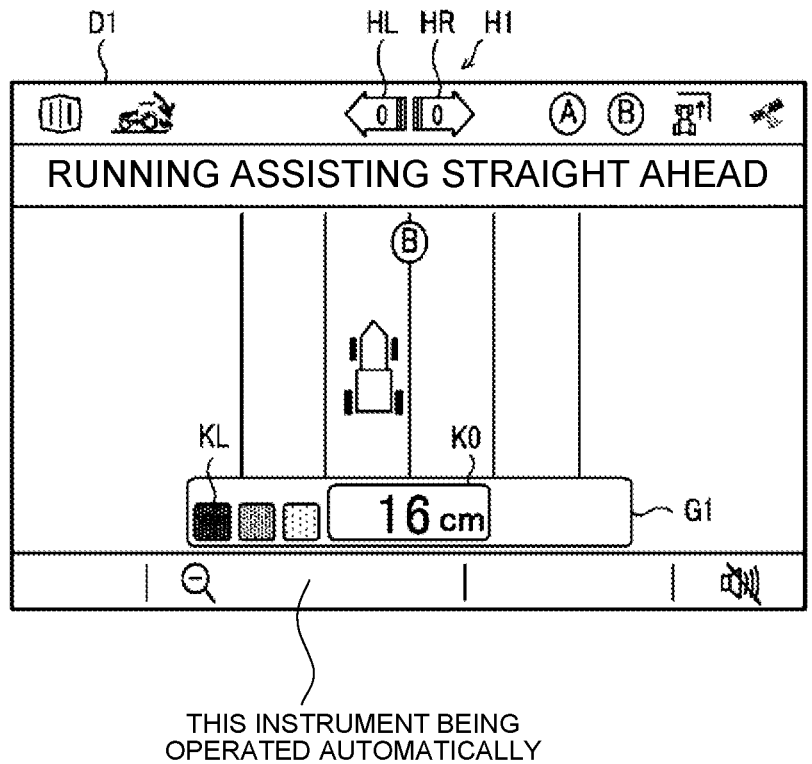
FIG. 8A is a diagram showing an example of a work screen displayed on the operation unit according to the embodiment of the present invention.
Figure 8B:
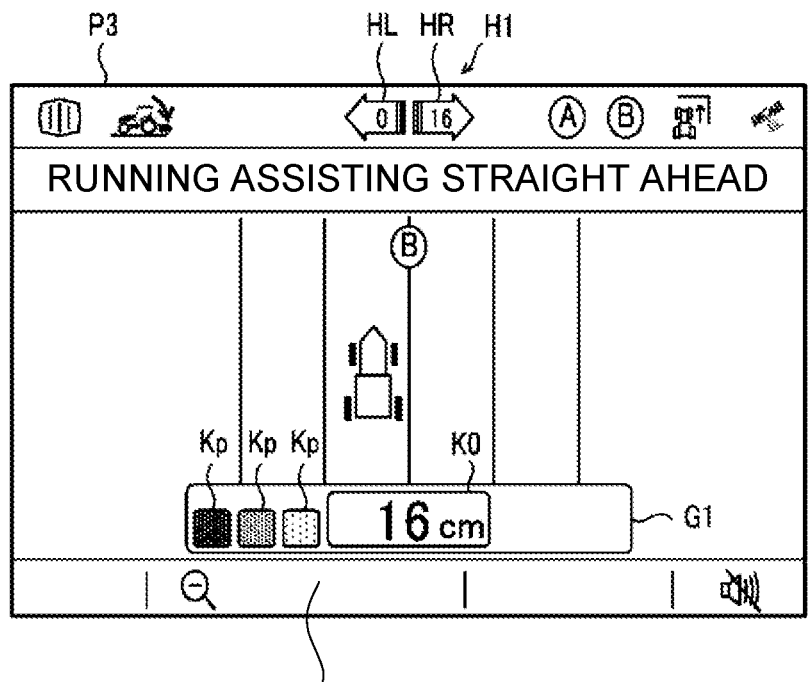
FIG. 8B is a diagram showing an example of the work screen displayed on the operation unit according to the embodiment of the present invention.

FIGS. 8A and 8B show an example of a work screen D1. As shown in FIG. 8A, the vehicle control unit 11 displays deviation information G1 on the work screen D1, and identifiably displays the positional deviation L in the deviation information G1 ("16 cm" in FIG. 8A). When the operator performs the offset action, the vehicle control unit 11 identifiably displays the offset amount in the offset information H1 of the work screen D1 ("16" in FIG. 8B). For example, the vehicle control unit 11 displays the offset amount "16" in right offset information HR, among the pieces of offset information H1. When the operator presses down the offset button (second offset button), the vehicle control unit 11 displays the offset amount in left offset information HL, among the pieces of offset information H1. In this way, the operation display unit 171 may have a first offset button for the right offset and a second offset button for the left offset. The first and second offset buttons may include one button or two buttons.

When the reception processing unit 112 receives the offset operation by the operator, the offset processing unit 113 controls an offset action of the work vehicle 10 according to the offset operation. The offset action is an example of a correcting action of the present invention.

By the way, in the conventional technology, the operator can optionally set the correction amount (offset amount) to the positional deviation L; thus, when the offset amount is larger than necessary, for example, the behavior of the work vehicle 10 performing the offset action becomes unstable, resulting in a problem of a deteriorated work accuracy. Then, the automatic run system 1 according to the present embodiment is provided with a configuration that can suppress the deteriorated work efficiency seen when correcting the positional deviation L of the work vehicle 10.

Specifically, the offset processing unit 113, when the positional deviation L is a threshold value Lth or over, prohibits the work vehicle 10's offset action which is in response to the offset operation. Further, the offset processing unit 113, when the positional deviation L is below the threshold value Lth, permits the work vehicle 10's offset action which is in response to the offset operation (causes the work vehicle 10 to perform the offset action). The threshold value Lth may be preset. For example, the threshold value Lth may be set to a uniform fixed value, or may be set based on information such as the size of the work vehicle 10, the size of the work instrument 14, the work content, and the shape of the farm field F. Further, the threshold value Lth is set to a value within the range where the work vehicle 10, when performing the offset action, does not become unstable in behavior. Here, for example, the threshold value Lth is set to "±25 cm".

For example, the vehicle control unit 11, while the work vehicle 10 is automatically running following the target route R, measures the positional deviation L between the work vehicle 10 and the target route R, and displays a measurement result in the deviation information G1 of the work screen D1. Specifically, the vehicle control unit 11 displays a numerical value of the positional deviation L (here, "16 cm") in a deviation display column K0 of the deviation information G1. Further, the vehicle control unit 11 displays an identification image Kp according to the deviation direction and deviation amount (positional deviation L) of the work vehicle 10. Here, the work vehicle 10 has deviated to the left relative to the target route R and the positional deviation L is a given amount or over; thus, the vehicle control unit 11 displays multiple (here three) identification images Kp in a manner to be arranged on the left side of the deviation display column K0. The vehicle control unit 11 so controls that the larger the positional deviation L, the more the number of identification images Kp. Further, the vehicle control unit 11 may vary the color of each identification image Kp according to the magnitude of the positional deviation L. In this way, the vehicle control unit 11 may cause the work screen D1 to display numerical or color information that is capable of identifying the positional deviation L. A display example of the deviation information G1 is to be described below (see [Displaying Process of Deviation Information] column below).

This allows the operator to intuitively grasp the direction and magnitude of the positional deviation L. When checking the positional deviation L, the operator presses down the offset button (offset operation) so that the target route R is offset to the right by the distance L.

Figure 9:
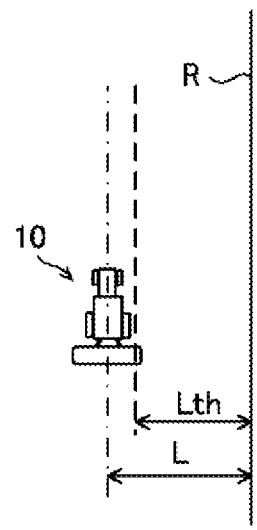
FIG. 9 is a diagram showing an example of a positional deviation according to the embodiment of the present invention.
Figure 10:
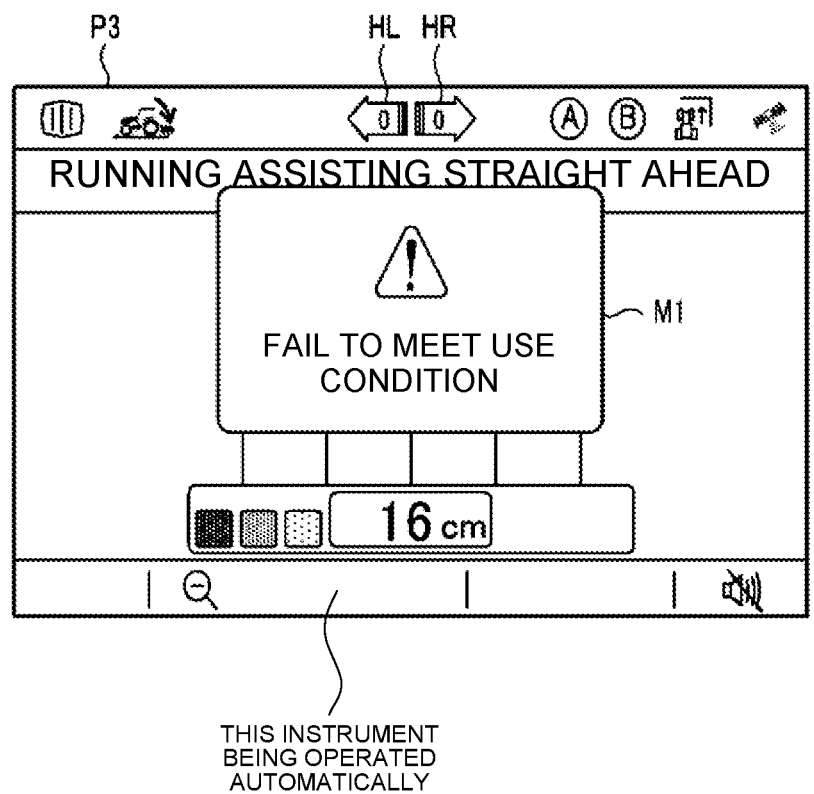
FIG. 10 is a diagram showing an example of the work screen displayed on the operation unit according to the embodiment of the present invention.

Here, when the reception processing unit 112 receives the offset operation from the operator with the positional deviation L being the threshold value Lth or over (see FIG. 9), the offset processing unit 113 prohibits the work vehicle 10's offset action. Specifically, the offset processing unit 113 displays, on the work screen D1, information showing that the offset action is prohibited. For example, as shown in FIG. 10, the offset processing unit 113, at the time point when the operator once presses down the offset button with the positional deviation L being the threshold value Lth or over, displays, on the work screen D1, a message M1 stating that the condition for using the offset operation (L<Lth) is not met. In place of displaying the message M1, the offset processing unit 113 may audibly output the message M1. Further, the offset processing unit 113 may perform both the displaying and audio outputting of the message M1.

This prevents the operator from performing the offset operation. Further, the work vehicle 10's offset action can also be prohibited.

Figure 11:
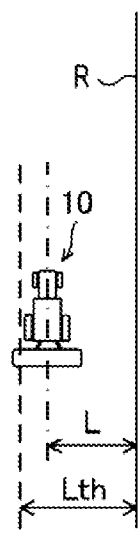
FIG. 11 is a diagram showing an example of the positional deviation according to the embodiment of the present invention.

In contrast, when the reception processing unit 112 receives the offset operation from the operator with the positional deviation L being below the threshold value Lth (see FIG. 11), the offset processing unit 113 performs the work vehicle 10's offset action. Here, since the positional deviation L "16 cm" is below the threshold value Lth "25 cm", the reception processing unit 112 receives the offset operation to offset to the right side by the distance L ("16 cm"). The offset processing unit 113 offsets the target route R in response to the offset operation. That is, the offset processing unit 113 sets a new target route (target route R' in FIG. 7) at the position offset by the operator.

Offsetting the target route R, the offset processing unit 113 causes the work vehicle 10 to automatically run (offset action) along the target route R' which is seen after the offset. This causes the work vehicle 10 to automatically run while moving to the right toward the target route R'. When the work vehicle 10 performs the offset action and matches the position of the target route R' or is within the given range of the target route R', the vehicle control unit 11 updates the deviation display column K0 (see FIG. 8B) to "0 cm".

Thus, setting an upper limit (threshold value Lth) of the positional deviation L for permitting the offset action can prevent the offset action that causes instability in the behavior of the work vehicle 10.

Figure 12A:
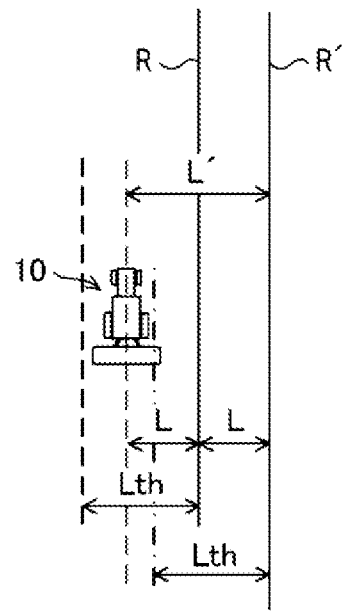
FIG. 12A is a diagram showing an example of the positional deviation according to the embodiment of the present invention.

As another embodiment; the offset processing unit 113, when the positional deviation L between the target route R and the work vehicle is below the threshold value Lth, and a positional deviation L' between the target route R' and the work vehicle 10 assuming that the target route R is offset is the threshold value Lth or over, may prohibit the offset action. For example, the work vehicle 10 shown in FIG. 12A is positioned at a position where the positional deviation L from the target route R is below the threshold value Lth. In this case, the offset processing unit 113 calculates the positional deviation L' (e.g., L'=L×2) between the work vehicle 10 and the offset position (target route R') that corresponds to the positional deviation L, and determines whether or not the calculated positional deviation L' is the threshold value Lth or over. The offset processing unit 113, when the positional deviation L' is the threshold value Lth or over, prohibits the offset action (see FIG. 12A). In this case, the offset processing unit 113, at the time point when the operator once presses down the offset button, displays, on the work screen D1, the message M1 stating that the condition for using the offset operation (L<Lth and L'<Lth) is not met (see FIG. 10).

Figure 12B:
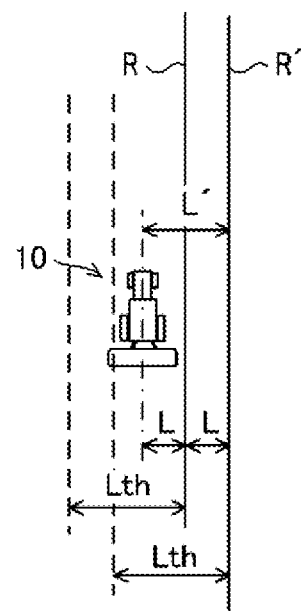
FIG. 12B is a diagram showing an example of the positional deviation according to the embodiment of the present invention.

Meanwhile, the offset processing unit 113, when the positional deviation L between the target route R and the work vehicle 10 is below the threshold value Lth, and when the positional deviation L' between the target route R' and the work vehicle 10 assuming that the target route R is offset is below the threshold value Lth, causes the work vehicle 10 to perform the offset action (See FIG. 12B).

According to this configuration, the upper limit of the positional deviation L that permits the offset action can be further reduced, thus making it possible to further stabilize the work vehicle 10's behavior seen during the offset action.

Here, even when the positional deviation L of the work vehicle 10 is caused, the work vehicle 10, by continuing to automatically run due to an influence of the positioning condition, farm field F's condition, etc. lessens the positional deviation L, as the case may be.

Then, as another embodiment, the offset processing unit 113 may determine, whether or not the positional deviation L is the threshold value Lth or over, at the time point when a given time has elapsed from the reception processing unit 112's receiving the offset operation from the operator. That is, the offset processing unit 113 determines, whether or not the offset action is ready, based on the positional deviation L at the time point of the elapse of the given time, rather than based on the positional deviation L seen at the time point of the reception processing unit 112's receiving the offset operation from the operator.

Specifically, the offset processing unit 113 prohibits the offset action when the positional deviation L is the threshold value Lth or over at the time point of an elapse of the given time since the reception processing unit 112's receiving the offset operation from the operator, and causes the work vehicle 10 to perform the offset action when the positional deviation L is below the threshold value Lth at the time point of an elapse of the given time since the reception processing unit 112's receiving the offset operation from the operator.

This configuration can avoid an unnecessary offset action. This can further improve the work efficiency. The offset processing unit 113 is an example of a correction processing unit of the present invention.

[Automatic Run Process]

Figure 13:
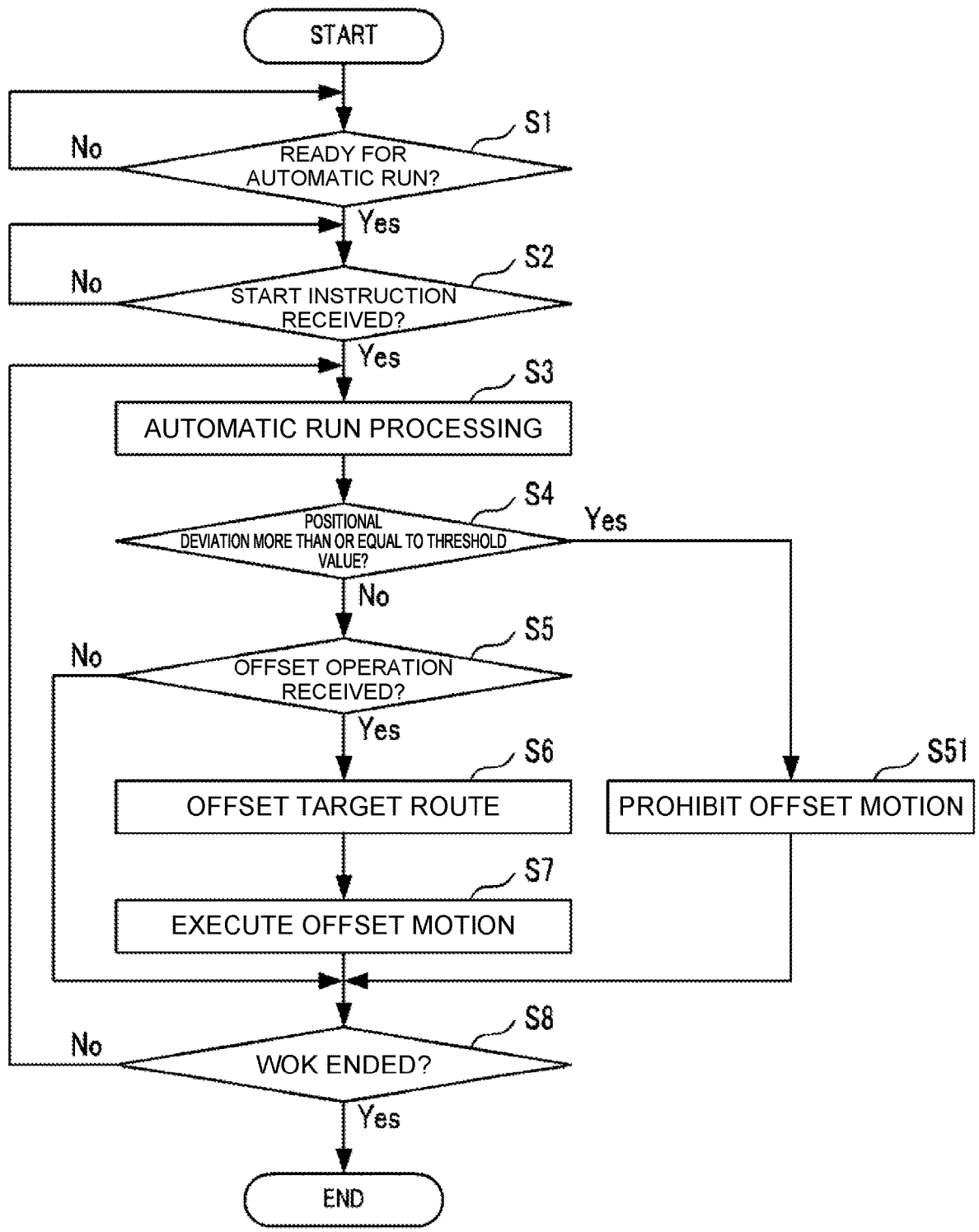
FIG. 13 is a flowchart showing an example of a procedure of an automatic run process performed by an automatic run system according to the embodiment of the present invention.

Hereinafter, with reference to FIG. 13, an example of the automatic run process performed by the vehicle control unit 11 is to be described. Note that the present invention may also be grasped as an invention of an automatic run method in which the vehicle control unit 11 performs part or all of the automatic run process or an invention of an automatic run program for causing the vehicle control unit 11 to perform part or all of the automatic run method. Further, one or more processors may perform the automatic run process.

First, at step S1, the vehicle control unit 11 determines whether or not the work vehicle 10 is ready for the automatic run. For example, the vehicle control unit 11, when the starting automatic run condition, such as the work vehicle 10's azimuth being within the given azimuth, is met, determines that the work vehicle 10 is ready for the automatic run. The vehicle control unit 11, when determining that the work vehicle 10 is ready for the automatic run (S1: Yes), moves the process to step S2. The vehicle control unit 11 waits until the work vehicle 10 is ready for the automatic run (S1: No).

Next, at step S2, the vehicle control unit 11 determines whether or not the operation for starting the automatic run (run start instruction) has been received from the operator. For example, when the operator presses down the automatic run button of the operation unit 17, the vehicle control unit 11 receives the run start instruction. The vehicle control unit 11, when receiving the run start instruction (S2: Yes), moves the process to step S3. The vehicle control unit 11 waits until receiving the run start instruction (S2: No).

At step S3, the vehicle control unit 11 performs the automatic run process. For example, the vehicle control unit 11 starts the automatic steering such that the work vehicle 10 is along the straight ahead route that is among the multiple straight ahead routes included in the target route R and that is closest to the current position PO (see FIG. 5C). With this, the vehicle control unit 11 causes the work vehicle 10 to automatically run by the automatic steering along the straight ahead route.

The vehicle control unit 11, while causing the work vehicle 10 to automatically run, measures the positional deviation L between the work vehicle 10 and the target route R, and displays the measured positional deviation L in the deviation information G1 of the work screen D1 (see FIG. 8A).

Next, at step S4, the vehicle control unit 11 determines whether or not the positional deviation L is the threshold value Lth or over. The vehicle control unit 11, when determining that the positional deviation L is the threshold value Lth or over (S4: Yes) (see FIG. 9), moves the process to step S51. Meanwhile, the vehicle control unit 11, when determining that the positional deviation L is below the threshold value Lth (S4: No) (see FIG. 11), moves the process to step S5.

At step S5, the vehicle control unit 11 determines whether or not the offset operation that corrects the positional deviation L has been received from the operator. For example, the operator, when checking the positional deviation L on the operation unit 17 (see FIG. 8A), performs the offset action that presses down the offset button (first offset button) so that the target route R is offset to the right by the distance L. When the positional deviation L is "16 cm to the left", the operator sets the offset amount to "16 cm to the right" (see FIG. 8B). The vehicle control unit 11 displays the offset amount "16" in the right offset information HR among the pieces of the offset information H1. The vehicle control unit 11, when receiving the offset operation (S5: Yes), moves the process to step S6. Meanwhile, the vehicle control unit 11, when failing to receive the offset operation (S5: No), moves the process to step S8.

At step S6, the vehicle control unit 11 offsets the target route R. Specifically, the vehicle control unit 11 moves the target route R to the position that corresponds to the offset amount set by the operator (see FIG. 7). The vehicle control unit 11 sets the new target route (target route R') at the position offset by the operator. Further, the vehicle control unit 11 causes the operation unit 17 to display the target route R' seen after the offset.

Next, at step S7, the vehicle control unit 11 causes the work vehicle 10 to perform the offset action. Specifically, the vehicle control unit 11 causes the work vehicle 10 to automatically run along the target route R' seen after the offset. With this, the work vehicle 10 automatically runs, while moving to the right toward the target route R' so that the positional deviation L becomes smaller. After step S7, the vehicle control unit 11 moves the process to the step S8.

In contrast, when the positional deviation L is the threshold value Lth or over (S4: Yes) (see FIG. 11), the vehicle control unit 11 prohibits the offset action at step S51. Specifically, the vehicle control unit 11 displays, on the work screen D1, the information (message M1) showing that the offset action is prohibited (see FIG. 10). After step S51, the vehicle control unit 11 moves the process to the step S8.

At step S8, the vehicle control unit 11 determines whether or not the work vehicle 10 has ended the work. The vehicle control unit 11, when the work vehicle 10 has ended the work (S8: Yes), ends the automatic run process. Meanwhile, the vehicle control unit 11, when the work vehicle 10 has not ended the work (S8: No), moves the process to step S3.

Thus, while the work vehicle 10 continues to work (S5: No and S8: No) without receiving the offset operation from the operator, the work vehicle 10 continues to automatically run (S3). While the work vehicle continues to automatically run, the positional deviation L changes. While the positional deviation L is below the threshold value (S4: No), the work vehicle 10, when receiving the offset operation from the operator, performs the offset action (S6), and, when failing to receive the offset operation from the operator, continues the automatic run (S3) as is. When the work vehicle 10 continues to automatically run and the positional deviation L becomes the threshold value or over (S4: Yes), the work vehicle 10's offset action is prohibited (S51).

The vehicle control unit 11, when the work vehicle 10 starts the automatic run, repeats the processes at steps S3 to S8 until the work by the work vehicle 10 ends. In the above processes, the vehicle control unit 11, when necessary, causes the work vehicle 10 to run in a turning manner by the manual steering by the operator.

As described above, the automatic run system 1 according to the present embodiment causes the work vehicle 10 to automatically run following the target route R, and receives, from the operator, the correcting operation (offset operation) to correct the positional deviation L between the work vehicle 10 and the target route R. Further, the automatic run system 1, when the positional deviation L is the threshold value Lth or over, prohibits the work vehicle 10's correcting action (offset action) that is in response to the correcting operation. Further, the automatic run system 1, when the positional deviation L is below the threshold value Lth, causes the work vehicle 10 to perform the correcting action (offset action). The correcting operation is, for example, an operation (offset operation) to move the target route R to the position that corresponds to the magnitude and direction of the positional deviation L.

According to the above configuration; when the positional deviation L is caused during the work vehicle 10's automatically running, for example, it is possible to prevent the operator from setting the offset amount that is more than necessary. This can prevent the work vehicle 10 from becoming unstable in behavior when performing the offset action. That is, when the positional deviation L is caused, the work vehicle 10 can be caused to stably perform the offset action. Then, it is possible to suppress the deteriorated work efficiency seen when correcting the positional deviation L of the work vehicle 10.

The present invention is not limited to the above embodiment. As another embodiment of the invention, the vehicle control unit 11 may set the threshold value Lth according to the work vehicle 10's vehicle speed. With the work vehicle 10's vehicle speed being high, the work vehicle 10, when performing the offset action, is likely to be affected by an azimuth change of the work vehicle 10, thus making the behavior easily unstable. Meanwhile, with the work vehicle 10's vehicle speed being low, the work vehicle 10, when performing the offset action, is unlikely to be affected by the azimuth change of the work vehicle 10, thus preventing the behavior from being unstable.

Then, the vehicle control unit 11, when the work vehicle 10's vehicle speed is a given speed or over, sets the threshold value, which is used for a determining process of the positional deviation L, to a first threshold value Lth1, and, when the work vehicle 10's vehicle speed is below the given speed, sets the threshold value, which is used for the determining process of the positional deviation L, to a second threshold value Lth2 (Lth2>Lth1). With this, when the work vehicle 10's vehicle speed is high, for example, lessening the upper limit of the positional deviation L that permits the offset action can stabilize the behavior seen during the offset action. Further, when the work vehicle 10's vehicle speed is low, for example, lessening the upper limit of the positional deviation L that permits the offset action makes it easy to receive the offset action to thereby make it possible to improve the convenience of the offset operation.

Further, as another embodiment of the invention, the vehicle control unit 11 may set the threshold value Lth in response to the operator's operation. For example, when the first threshold value Lth1 and the second threshold value Lth2 are displayed on the setting screen (not shown) displayed on the operation unit 17 and the operator selects any thereof, the vehicle control unit 11 sets the threshold value selected by the operator.

Further, the vehicle control unit 11, which has a mode (first mode) that makes it easier to receive the offset operation thereby to prioritize the positional accuracy and work accuracy of the work vehicle 10, and a mode (second mode) that limits the offset operation thereby to prioritize the work vehicle 10's movement and the work's continuity, may set the threshold value Lth in response to the mode selected by the operator. For example, the vehicle control unit 11, when the operator selects the first mode, sets the first threshold value Lth1, and, when the operator selects the second mode, sets the second threshold value Lth2 (Lth2>Lth1). This makes it possible to realize the offset operation that is in response to be the operator's desire.

In the above embodiment, the offset operation, in which the operator presses down the offset button, is used as one example of the correcting operation of the present invention; the correcting operation of the present invention is, however, not limited to this. For example, the correcting operation may be an input operation in which the operator enters the offset amount (numerical value) on the work screen D1. Further, the vehicle control unit 11, when the operator once presses down the offset button, may set the positional deviation L to the offset amount.

Further, in the above embodiment, the vehicle control unit 11 is so configured that the message M1 is displayed on the work screen D1 when the positional deviation L is the threshold value Lth or over (see FIG. 10), and the offset operation by the operator is not received; as another embodiment, however, the vehicle control unit 11, even when the positional deviation L is the threshold value Lth or over, may receive the operator's offset operation. In this case, the vehicle control unit 11 may be so configured as to perform the offset action when the offset amount by the offset operation is below the given value (e.g., threshold value Lth), and as to prohibit the offset action when the offset amount by the offset operation is the given value (e.g., threshold value Lth) or over.

[Displaying Process of Deviation Information]

Specific examples of the displaying process of the deviation information are to be described by using FIGS. 14A to 14H. The vehicle control unit 11 measures the positional deviation L between the work vehicle 10 and the target route R, and displays the measured positional deviation L in the deviation information G1 of the work screen D1 (see FIG. 8A). FIGS. 14A to 14H each show a display example of the deviation information G1.

Figure 14A:
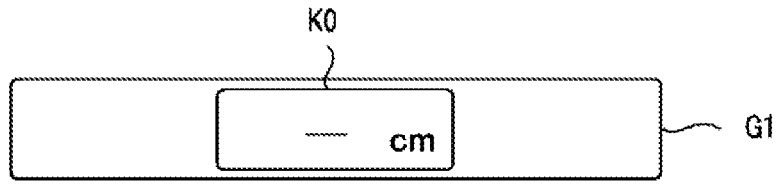
FIG. 14A is a diagram showing an example of a display mode of deviation information according to the embodiment of the present invention.

The vehicle control unit 11, when it is so set as not to measure the measured positional deviation L or when a communication error is caused, for example, displays "—" in the deviation display column K0, as shown in FIG. 14A.

Figure 14B:
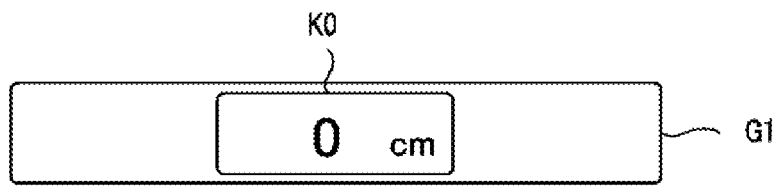
FIG. 14B is a diagram showing an example of the display mode of the deviation information according to the embodiment of the present invention.

Further, the vehicle control unit 11, when the measured positional deviation L is below 1 cm, for example, displays "0 cm" in the deviation display column K0, as shown in FIG. 14B.

Figure 14C:
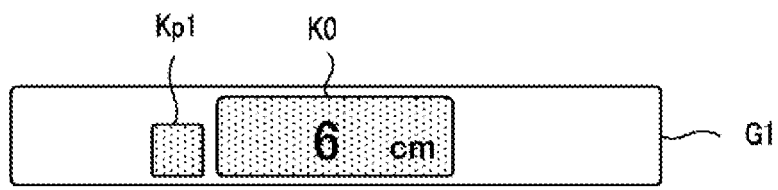
FIG. 14C is a diagram showing an example of the display mode of the deviation information according to the embodiment of the present invention.

Further, the vehicle control unit 11, when the measured positional deviation L is 1 cm or over to below 11 cm (e.g., L=6 cm) and when the direction of the positional deviation is to the left, for example, displays "6 cm" in the deviation display column K0, and displays the identification image Kp1 (one) on the left side of the deviation display column K0, as shown in FIG. 14C. Further, the vehicle control unit 11 displays the identification image Kp1 and the deviation display column K0 in a first mode (e.g., green).

Figure 14D:
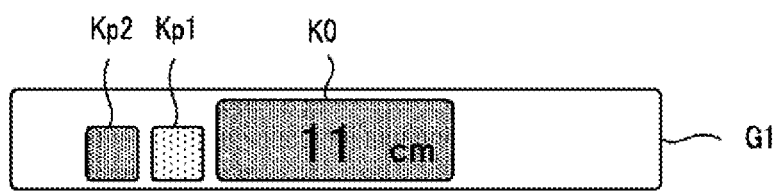
FIG. 14D is a diagram showing an example of the display mode of the deviation information according to the embodiment of the present invention.

Further, the vehicle control unit 11, when the measured positional deviation L is 11 cm or over to below 16 cm (e.g., L=11 cm) and when the direction of the positional deviation is to the left, for example, displays "11 cm" in the deviation display column K0, and displays the identification images Kp1 and Kp2 (two) on the left side of the deviation display column K0, as shown in FIG. 14D. Further, the vehicle control unit 11 displays the identification image Kp2 and the deviation display column K0 in a second mode (e.g., yellow), and displays the identification image Kp1 in the first mode (e.g., green).

Figure 14E:
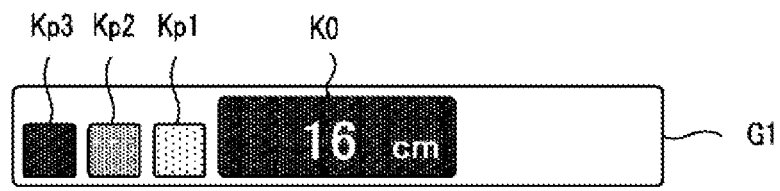
FIG. 14E is a diagram showing an example of the display mode of the deviation information according to the embodiment of the present invention.

Further, the vehicle control unit 11, when the measured positional deviation L is 16 cm or over (e.g., L=16 cm) and the direction of the positional deviation is to the left, for example, displays "16 cm" in the deviation display column K0, and displays the identification images Kp1, Kp2 and Kp3 (three) on the left side of the deviation display column K0, as shown in FIG. 14E. Further, the vehicle control unit 11 displays the identification image Kp3 and the deviation display column K0 in a third mode (e.g., red), displays the identification image Kp1 in the first mode (e.g., green), and displays the identification image Kp2 in the second mode (e.g., yellow).

Figure 14F:
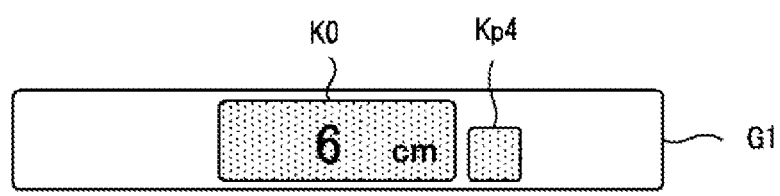
FIG. 14F is a diagram showing an example of the display mode of the deviation information according to the embodiment of the present invention.

Further, the vehicle control unit 11, when the measured positional deviation L is 1 cm or over to below 11 cm (e.g., L=6 cm) and the direction of the positional deviation is to the right, for example, displays "6 cm" in the deviation display column K0, and displays the identification image Kp4 (one) on the right side of the deviation display column K0, as shown in FIG. 14F. Further, the vehicle control unit 11 displays the identification image Kp4 and the deviation display column K0 in the first mode (e.g., green).

Figure 14G:
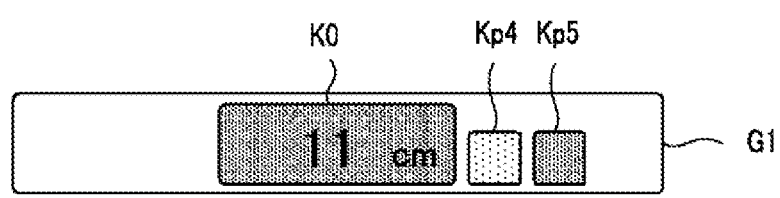
FIG. 14G is a diagram showing an example of the display mode of the deviation information according to the embodiment of the present invention.

Further, the vehicle control unit 11, when the measured positional deviation L is 11 cm or over to below 16 cm (e.g., L=11 cm) and the direction of the positional deviation is to the right, for example, displays "11 cm" in the deviation display column K0, and displays the identification images Kp4 and Kp5 (two) on the right side of the deviation display column K0, as shown in FIG. 14G. Further, the vehicle control unit 11 displays the identification image Kp5 and the deviation display column K0 in the second mode (e.g., yellow), and displays the identification image Kp4 in the first mode (e.g., green).

Figure 14H:
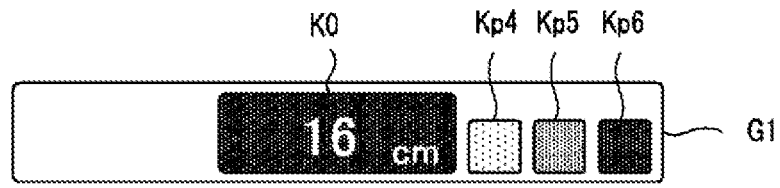
FIG. 14H is a diagram showing an example of the display mode of the deviation information according to the embodiment of the present invention.

Further, the vehicle control unit 11, when the measured positional deviation L is 16 cm or over (e.g., L=16 cm) and the direction of the positional deviation is to the right, for example, displays "16 cm" in the deviation display column K0, and displays the identification images Kp4, Kp5 and Kp6 (three) on the right side of the deviation display column K0, as shown in FIG. 14H. Further, the vehicle control unit 11 displays the identification image Kp6 and the deviation display column K0 in the third mode (e.g., red), displays the identification image Kp4 in the first mode (e.g., green), and displays the identification image Kp5 in the second mode (e.g., yellow).

As described above, the vehicle control unit 11 changes the display number and display mode of the identification image Kp based on the direction and magnitude of the positional deviation L. This allows the operator to intuitively grasp the direction and magnitude of the positional deviation. Also, the vehicle control unit 11 may output an audio based on the direction and magnitude of the positional deviation L.

The work vehicle 10 of the present invention may be ready for the automatic run even at the time of turn. In this case, the target route R includes the straight ahead route and the turn route. Further, the work vehicle 10 may automatically run on the target route R in an unmanned manner. In this case, the operator, by remotely controlling the operation terminal, may give the run start instruction, and perform the offset operation, etc.

The automatic run system of the present invention may be configured with the work vehicle 10 alone, or may be so configured as to be provided with each processing unit included in the vehicle control unit 11. Further, the automatic run system may be mounted on the work vehicle 10 or outside of the work vehicle 10, such as the operation terminal (tablet terminal, smartphone, and the like), for example.

REFERENCE SIGNS LIST

1: automatic run system
10: work vehicle
20: satellite
11: vehicle control unit
13: run unit
14: work instrument
17: operation unit (operation terminal)
111: run processing unit
112: reception processing unit
113: offset processing unit (correction processing unit)
171: operation display unit
D1: work screen
F: farm field
G1: deviation information
H1: offset information
HL: left offset information
HR: right offset information
K0: deviation display column
Kp: identification image
L: positional deviation
L1: reference line
Lth: threshold value
M1: message
R: target route
R': target route (after offset)

The invention claimed is:

1. A processor-implemented automatic run method of a work vehicle comprising:
   causing the work vehicle to automatically run following a target route;
   receiving, from an operator, a correcting operation that corrects a positional deviation between the work vehicle and the target route; and
   prohibiting automatically, when the positional deviation is at a threshold value or over, the work vehicle's correcting action that is in response to the correcting operation, and if not over the threshold value continuing the correcting operation.

2. The processor-implemented automatic run method according to claim 1, further comprising:
   causing, when the positional deviation is below the threshold value, the work vehicle to perform the correcting action that is in response to the correcting operation.

3. The processor-implemented automatic run method according to claim 1, wherein
   the correcting operation is an operation to move the target route to a position that corresponds to magnitude and direction of the positional deviation.

4. The processor-implemented automatic run method according to claim 3, wherein
   (i) the correcting action is prohibited,
   when the positional deviation from the target route is below the threshold value, and when the positional deviation between a new target route and the work vehicle is at the threshold value or over, with calculating the new target route by moving the target route by the correcting operation, and
   (ii) the correcting operation is performed,
   when the positional deviation from the target route is below the threshold value, and when the positional deviation between the new target route and the work vehicle is below the threshold value with calculating the new target route by moving the target route by the correcting operation.

5. The processor-implemented automatic run method according to claim 1, wherein
   when the positional deviation from the target route is at the threshold value or over at a time point of an elapse of a given time after the receiving of the correcting operation, the correcting action that is in response to the correcting operation is prohibited, and
   when the positional deviation from the target route is below the threshold value at the time point of the elapse of the given time after the receiving of the correcting operation, the correcting action that is in response to the correcting operation is performed.

6. The processor-implemented automatic run method according to claim 1, wherein
   the threshold value is set in response to a vehicle speed of the work vehicle or to an operation of the operator.

7. The processor-implemented automatic run method according to claim 1, further comprising:
   causing an operation terminal to display information showing that the correcting action is prohibited.

8. The processor-implemented automatic run method according to claim 1, wherein
   an operation terminal receives the correcting operation from the operator.

9. The processor-implemented automatic run method according to claim 1, further comprising:
   causing an operation terminal to display numerical or color information that is capable of identifying the positional deviation.

10. An automatic run system of a work vehicle comprising:
   a run processing unit that causes the work vehicle to automatically run following a target route;
   a reception processing unit that receives, from an operator, a correcting operation that corrects a positional deviation between the work vehicle and the target route; and
   a correction processing unit that prohibits automatically, when the positional deviation is at a threshold value or over, the work vehicle's correcting action that is in response to the correcting operation, and if not over the threshold value continues the correcting operation.

11. A non-transitory computer-readable medium for storing an automatic run program for causing one or more processors to execute operations comprising:
   causing a work vehicle to automatically run following a target route;
   receiving, from an operator, a correcting operation that corrects a positional deviation between the work vehicle and the target route; and
   prohibiting automatically, when the positional deviation is at a threshold value or over, the work vehicle's correcting action that is in response to the correcting operation, and if not over the threshold value continuing the correcting operation.

* * * * *